United States Patent
Suciu et al.

(10) Patent No.: US 9,611,034 B1
(45) Date of Patent: Apr. 4, 2017

(54) WIDE FUSELAGE AIRCRAFT WITH INCREASED BOUNDARY LAYER INGESTION

(71) Applicant: United Technologies Corporation, Hartford, CT (US)

(72) Inventors: Gabriel L. Suciu, Glastonbury, CT (US); Jesse M. Chandler, South Windsor, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/930,712

(22) Filed: Nov. 3, 2015

(51) Int. Cl.
| | | |
|---|---|---|
| *B64C 21/08* | (2006.01) | |
| *B64D 33/02* | (2006.01) | |
| *B64D 27/20* | (2006.01) | |

(52) U.S. Cl.
CPC .............. *B64C 21/08* (2013.01); *B64D 27/20* (2013.01); *B64D 33/02* (2013.01); *B64C 2230/06* (2013.01); *B64D 2033/0226* (2013.01); *B64D 2033/0253* (2013.01)

(58) Field of Classification Search
CPC B64D 27/20; B64D 33/02; B64D 2033/0226; B64D 2033/0253; B64D 2033/0273; B64D 2033/0286; B64C 21/08; B64C 2230/06; F02C 7/042; F05D 2250/51; F05D 2250/90
See application file for complete search history.

(56) References Cited

U.S. PATENT DOCUMENTS

| | | | | |
|---|---|---|---|---|
| 2,477,637 | A * | 8/1949 | Mercier ................ | B64C 21/06 244/130 |
| 3,568,694 | A * | 3/1971 | Johnson ................ | B64D 33/02 137/15.1 |
| 3,576,300 | A * | 4/1971 | Palfreyman ............ | B64D 27/20 244/1 N |
| 3,915,413 | A * | 10/1975 | Sargisson .............. | B64D 33/02 137/15.2 |
| 3,951,360 | A * | 4/1976 | Anxionnaz ............ | B64C 21/06 114/67 R |
| 4,899,958 | A * | 2/1990 | Horikawa .............. | B64D 33/02 137/15.1 |
| 6,634,595 | B2 * | 10/2003 | Koncsek ............... | B64D 33/02 137/15.1 |
| 6,945,494 | B2 * | 9/2005 | Bagnall ................ | B64D 33/02 244/53 B |
| 7,014,145 | B2 * | 3/2006 | Bagnall ................ | B64D 33/02 244/53 B |

(Continued)

OTHER PUBLICATIONS https://en.wikipedia.org/wiki/Frigate_Ecojet.
https://www.flightglobal.com/news/articles/analysis-will-boeings-next-aircraft-be-an-oval-or-417256 Copyright 2015.

*Primary Examiner* — Joseph W Sanderson
(74) *Attorney, Agent, or Firm* — Carlson, Gaskey & Olds, PC

(57) ABSTRACT

An arrangement for reducing drag on the body of an aircraft with a relatively wide fuselage comprises a gas turbine engine. At least one duct is selectively moveable between a closed position and an open position, such that the at least one duct allows airflow to move toward a fan rotor in the gas turbine engine in the open position, but blocks airflow when in the closed position. An aircraft body is also disclosed.

18 Claims, 3 Drawing Sheets

(56) References Cited

U.S. PATENT DOCUMENTS

| | | | | |
|---|---|---|---|---|
| 7,832,684 B2 * | 11/2010 | Scherer | ............... | B64D 13/00 |
| | | | | 137/15.1 |
| 8,548,780 B2 | 10/2013 | Skelly et al. | | |
| 8,678,743 B1 | 3/2014 | Sheridan et al. | | |
| 8,746,616 B2 | 6/2014 | Barmichev et al. | | |
| 8,753,065 B2 | 6/2014 | Sheridan et al. | | |
| 8,807,916 B2 | 8/2014 | Sheridan et al. | | |
| 8,814,494 B1 | 8/2014 | Sheridan et al. | | |
| 8,899,520 B2 | 12/2014 | Barmichev et al. | | |
| 9,126,679 B2 * | 9/2015 | Lippinois | ............... | B64D 33/02 |
| 2003/0132342 A1 * | 7/2003 | Koncsek | ............... | B64D 33/02 |
| | | | | 244/53 B |
| 2013/0284279 A1 * | 10/2013 | Richards | ............... | B64D 33/02 |
| | | | | 137/15.1 |
| 2014/0260182 A1 * | 9/2014 | Suciu | ............... | F02C 3/10 |
| | | | | 60/224 |
| 2014/0283921 A1 * | 9/2014 | Lippinois | ............... | B64D 33/02 |
| | | | | 137/15.1 |
| 2015/0291285 A1 * | 10/2015 | Gallet | ............... | F01D 13/02 |
| | | | | 415/60 |

* cited by examiner

WIDE FUSELAGE AIRCRAFT WITH INCREASED BOUNDARY LAYER INGESTION

BACKGROUND OF THE INVENTION

One proposed type of aircraft has a very wide fuselage. With a wide fuselage, there is an increased boundary layer drag.

It has been proposed to ingest boundary layer air from an upper surface of the fuselage into gas turbine engines mounted in the tail. This decreases the drag from the upper boundary layer. However, further improvements in the aerodynamics of such aircraft are desired.

SUMMARY OF THE INVENTION

In a featured embodiment, an arrangement for reducing drag on the body of an aircraft with a relatively wide fuselage comprises a gas turbine engine. At least one duct is selectively moveable between a closed position and an open position, such that the at least one duct allows airflow to move toward a fan rotor in the gas turbine engine in the open position, but blocks airflow when in the closed position.

In another embodiment according to the previous embodiment, there are at least two of the ducts, with each of the ducts being moveable between open and closed position.

In another embodiment according to any of the previous embodiments, airflow from an upper surface of an aircraft fuselage that will receive the arrangement will reach the fan rotor when the at least two ducts are in either the open or closed positions.

In another embodiment according to any of the previous embodiments, at least one motor and control drive the at least two ducts between the open and closed position In another embodiment according to any of the previous embodiments, a mechanical connection connects each of the at least two ducts, such that a single drive can drive the at least two ducts.

In another embodiment according to any of the previous embodiments, the at least two ducts pivot about pivot axes between the open and closed positions.

In another embodiment according to any of the previous embodiments, the duct pivots about a pivot axis between the open and closed positions.

In another embodiment according to any of the previous embodiments, a motor and control drive the duct between the open and closed position.

In another embodiment according to any of the previous embodiments, airflow from an upper surface of an aircraft fuselage that will receive the arrangement will reach the fan rotor when the at least two ducts are in either the open or closed positions.

In another featured embodiment, an aircraft body comprises a relatively wide fuselage leading toward a tail section, and a pair of gas turbine engines mounted in the tail section. An upper surface of the fuselage leads into an inlet which is positioned vertically below the upper surface to deliver boundary layer air from the upper surface into the gas turbine engines. At least one duct is selectively moveable between a blocking position and an open position, such that the at least one duct allows airflow to move toward a fan rotor in the gas turbine engines in the open position, but blocks airflow when in the closed position.

In another embodiment according to the previous embodiment, there are at least two ducts, with each of the ducts being moveable between open and closed position.

In another embodiment according to any of the previous embodiments, airflow from an upper surface of an aircraft fuselage that will receive the arrangement will reach the fan rotor when the at least two ducts are in either the open or closed positions.

In another embodiment according to any of the previous embodiments, at least one motor and control drive the at least two ducts between the open and closed position.

In another embodiment according to any of the previous embodiments, a mechanical connection connects each of the at least two ducts, such that a single drive can drive the at least two ducts.

In another embodiment according to any of the previous embodiments, the at least two ducts pivot about pivot axes between the open and closed positions.

In another embodiment according to any of the previous embodiments, at least one motor and control drive the at least two ducts between the open and closed position.

In another embodiment according to any of the previous embodiments, a mechanical connection connects each of the at least two ducts, such that a single drive can drive the at least two ducts.

In another embodiment according to any of the previous embodiments, the duct pivots about a pivot axis between the open and closed positions.

In another embodiment according to any of the previous embodiments, a motor and control drive the duct between the open and closed position.

In another embodiment according to any of the previous embodiments, airflow from an upper surface of an aircraft fuselage that will receive the arrangement will reach the fan rotor when the at least two ducts are in either the open or closed positions.

In another embodiment according to any of the previous embodiments, the relatively wide fuselage has a width and a height, and a width to height ratio is greater than or equal to at least 1.5.

This application relates to a gas turbine engine which takes in boundary layer air from upper and lower sides of a wide fuselage aircraft body.

These and other features may be best understood from the following drawings and specification.

DETAILED DESCRIPTION

Figure 1:
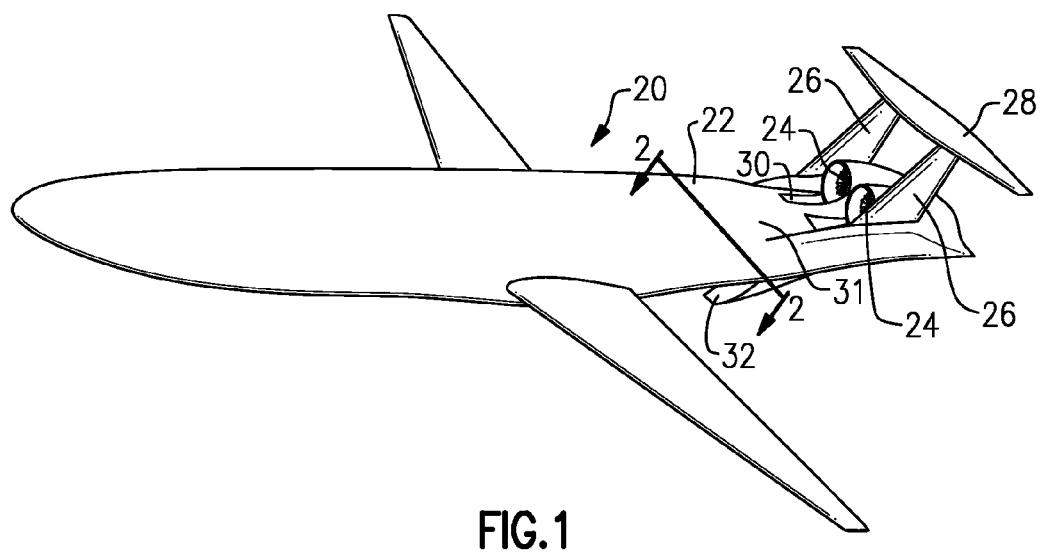
FIG. 1 shows an embodiment of an aircraft body.

FIG. 1 shows an aircraft body 20 having a wide fuselage 22. Engines 24 are mounted between stabilizers 26, which connect to the tail 28. An inlet 30 to the gas turbine engines 24 curves away from an upper surface of the fuselage 22. This is so the boundary layer air on the top surface 31 of the fuselage 22 can be ingested into the gas turbine engine to reduce drag.

Figure 2:
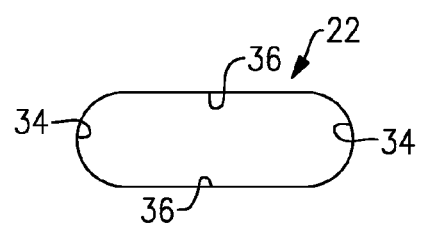
FIG. 2 is a cross-section along line 2-2 as shown in FIG. 1.

FIG. 2 is a somewhat schematic cross-sectional view showing the fuselage portion 22. There are generally outer part circular portions 34 and elongated straighter portions 36. It could be said that the central portions are less curved than the side portions 34. The fuselage is not generally cylindrical in cross section. This differs from the prior art conventional tube+wing aircraft in which the fuselage is basically a cylindrical tube. The noncylindrical fuselage has a horizontal width significantly greater than its vertical height. This configuration may be achieved with a double bubble, which is essentially two cylinders blended together in the horizontal direction, or more generally any elongated or elliptical cross section that has width to height ratio significantly greater than unity. In embodiments, the width to height ratio is at least greater than 1.0, and in embodiments greater than or equal to 1.5. The flattened noncylindrical fuselage shape has several potential advantages. It has less external wetted surface area for a given number of passengers compared to the cylindrical cross section, thus lower aerodynamic drag. The flattened fuselage shape may be able to carry some lift, thus reducing the amount of lift required from the wings and the associated wing area.

Figure 3:
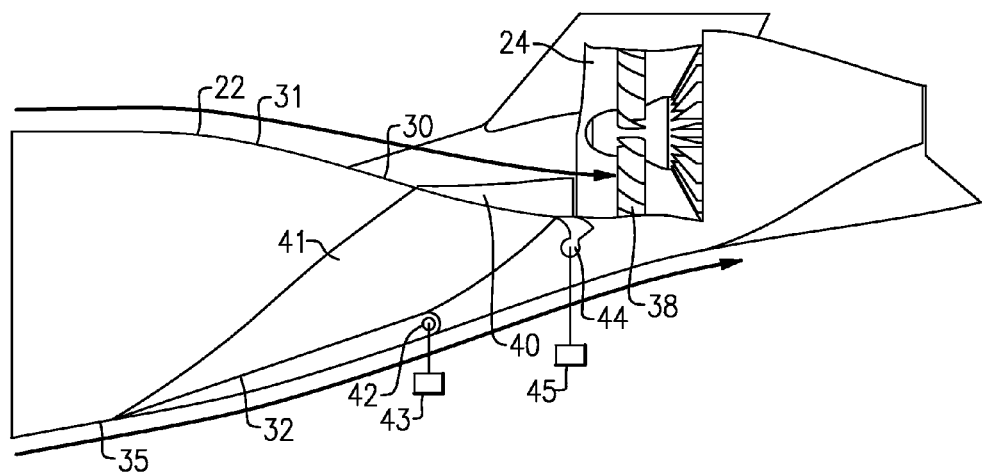
FIG. 3 shows a feature in a tail of the aircraft body of FIG. 1.

As mentioned above, there are drag issues with such aircraft. By utilizing the inlet 30, a good deal of boundary layer air is removed. However, there is also boundary layer air on a lower surface 35 of the aircraft 20 and as shown in FIG. 3. Thus, in FIG. 3, a system is provided that selectively draws air from the lower surface into the gas turbine engine 24. The upper inlet 30 is still utilized. As can be seen, the fan rotor 38 for the engine 24 will be vertically below the upper surface 31 leading into the inlet.

An outer duct wall 32 and an upper duct wall 40 are driven about pivot points 42 and 44. A drive for selectively driving the two to pivot between the FIG. 3 and FIG. 4 open positions is also provided. Of course, a control would control the drive arrangements. The drive and controls are shown schematically as 43 and 45.

In the FIG. 3 position, the duct walls 32 and 40 block airflow through a path 41 from the lower surface 35 to the fan rotor 38. This position might be utilized at takeoff where ground debris could undesirably enter into the path 41.

Figure 4:
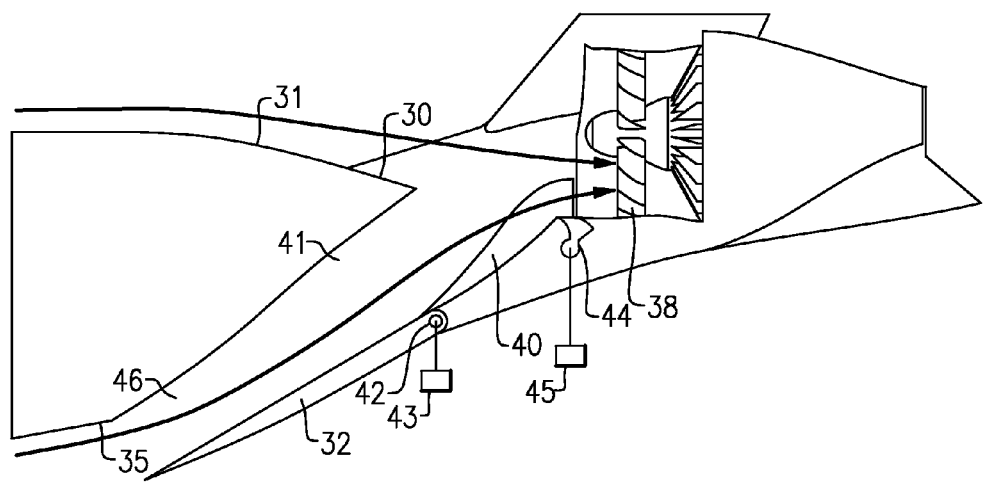
FIG. 4 shows the FIG. 3 structure in a different position.

However, at other conditions, such as cruise conditions, the duct walls 32 and 40 may be driven to an open position such as shown in FIG. 4. Now, lower boundary layer air can enter into an inlet 46, through passage 41 and reach the fan rotor 38. This will dramatically reduce the drag from the boundary layer air both on the upper surface 31 and on the lower surface 35.

Figure 5:
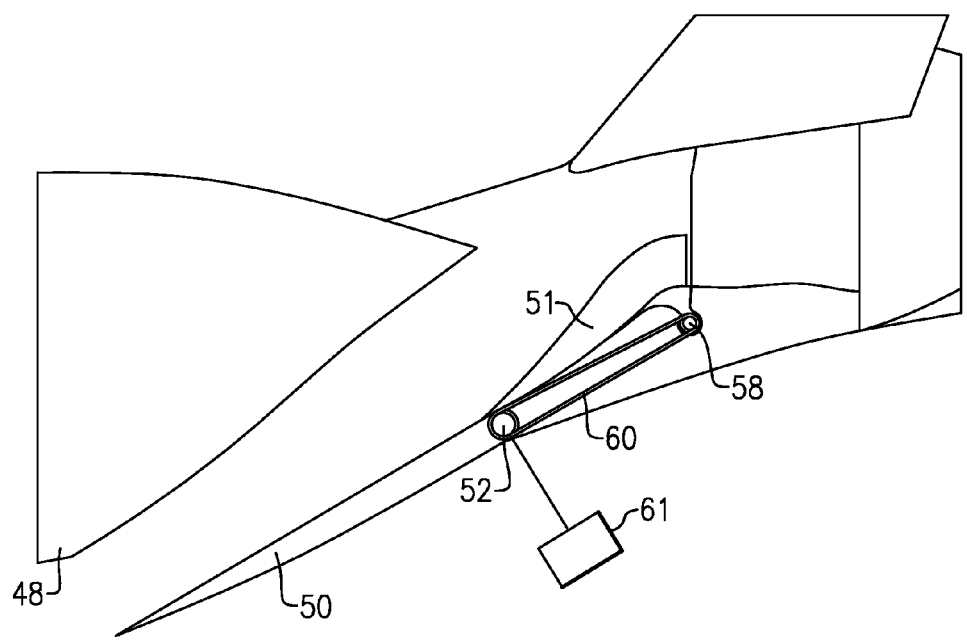
FIG. 5 shows an alternative embodiment.

FIG. 5 shows an alternative embodiment where the passageway 48 is again closed by a pair of duct walls 50 and 51. The duct walls again pivot about pivot points 52 and 58. However, a belt 60 connects the two duct walls. Again, a drive and control 61 may be utilized, however, because of the mechanical connection, a single drive can pivot both ducts.

In either the FIGS. 3, 4 or FIG. 5 embodiments, at takeoff, the duct walls may be moved to a closed position. However, at other times, such as cruise operation, the duct walls may be moved to an open position to reduce drag.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An arrangement for reducing drag on the body of an aircraft with a relatively wide fuselage comprising:
    a gas turbine engine;
    at least one duct wall being selectively moveable between a closed position and an open position, such that said at least one duct wall allows airflow from below the fuselage to move toward a fan rotor in said gas turbine engine in said open position, but blocks airflow when in said closed position, and said at least one duct wall being in said closed position at take-off, and in said open position at cruise; and
    airflow from an upper surface of the fuselage that will receive said arrangement will reach the fan rotor when said at least one duct wall is in both said open or closed positions.

2. The arrangement as set forth in claim 1, wherein there are at least two of said duct walls, with each of said duct walls being moveable between open and closed positions.

3. The arrangement as set forth in claim 2, wherein airflow from an upper surface of the aircraft fuselage that will receive said arrangement will reach the fan rotor when said at least two duct walls are in both said open or closed positions.

4. The arrangement as set forth in claim 2, wherein at least one motor and control drive said at least two duct walls between the open and closed positions.

5. The arrangement as set forth in claim 4, wherein a mechanical connection connects each of said at least two duct walls, such that a single one of said at least one motor can drive said at least two duct walls.

6. The arrangement as set forth in claim 4, wherein said at least two duct walls pivot about pivot axes between the open and closed positions.

7. The arrangement as set forth in claim 1, wherein said at least one duct wall pivots about a pivot axis between the open and closed positions.

8. The arrangement as set forth in claim 1, wherein a motor and control drive the duct wall between the open and closed positions.

9. An aircraft body comprising:
    a relatively wide fuselage leading toward a tail section, and a pair of gas turbine engines mounted in said tail section;
    an upper surface of said fuselage leading into an inlet which is positioned vertically below said upper surface to deliver boundary layer air from the upper surface into said gas turbine engines;
    at least one duct wall selectively moveable between a blocking position and an open position, such that said at least one duct wall allows airflow from below the fuselage to move toward a fan rotor in said gas turbine engines in said open position, but blocks airflow when in said closed position, and said at least one duct wall being in said closed position at take-off, and in said open position at cruise;
    airflow from an upper surface of the fuselage that will receive said arrangement will reach the fan rotor when said at least one duct wall is in both said open or closed positions; and
    the relatively wide fuselage has a width and a height, and a width to height ratio is greater than or equal to at least 1.5.

10. The aircraft body as set forth in claim 9, wherein there are at least two duct walls, with each of said duct walls being moveable between open and closed positions.

11. The aircraft body as set forth in claim 10, wherein airflow from an upper surface of the fuselage that will receive said arrangement will reach the fan rotor when said at least two duct walls are in both said open or closed positions.

12. The aircraft body as set forth in claim 11, wherein at least one motor and control drive said at least two duct walls between the open and closed positions.

13. The aircraft body as set forth in claim 12, wherein a mechanical connection connects each of said at least two duct walls, such that a single one of said at least one motor can drive said at least two duct walls.

14. The aircraft body as set forth in claim 13, wherein said at least two duct walls pivot about pivot axes between the open and closed positions.

15. The aircraft body as set forth in claim 10, wherein at least one motor and control drive said at least two duct walls between the open and closed positions.

16. The aircraft body as set forth in claim 15, wherein a mechanical connection connects each of said at least two duct walls, such that a single one of said at least one motor can drive said at least two ducts.

17. The aircraft body as set forth in claim 9, wherein said at least one duct wall pivots about a pivot axis between the open and closed positions.

18. The aircraft body as set forth in claim 9, wherein a motor and control drive the at least one duct wall between the open and closed positions.

\* \* \* \* \*